United States Patent [19]
Winkler et al.

[11] Patent Number: 5,594,862
[45] Date of Patent: Jan. 14, 1997

[54] XOR CONTROLLER FOR A STORAGE SUBSYSTEM

[75] Inventors: Jeffrey L. Winkler, Princeton; Jeffrey A. Wilcox, Bourne, both of Mass.

[73] Assignee: EMC Corporation, Hopkinton, Mass.

[21] Appl. No.: 278,870

[22] Filed: Jul. 20, 1994

[51] Int. Cl.⁶ .......................... G06F 11/00; H03M 13/00
[52] U.S. Cl. ..................... 395/182.03; 371/37.8; 371/49.2
[58] Field of Search ..................... 371/10.1, 37.8, 371/21.6, 30, 37.1, 49.2, 49.1, 51.1, 10.2, 10.3; 395/575, 182.03, 183.12, 183.08

[56] References Cited

U.S. PATENT DOCUMENTS

| | | | |
|---|---|---|---|
| 4,454,595 | 6/1984 | Cage | 364/900 |
| 4,916,556 | 4/1990 | Sander et al. | 360/45 |
| 4,979,056 | 12/1990 | Squires et al. | 360/69 |
| 5,014,237 | 5/1991 | Masters et al. | 364/900 |
| 5,016,121 | 5/1991 | Peddle et al. | 360/39 |
| 5,029,169 | 7/1991 | Smyk | 371/19 |
| 5,072,378 | 12/1991 | Manka | 395/575 |
| 5,075,805 | 12/1991 | Peddle et al. | 360/61 |
| 5,088,033 | 2/1992 | Binkley et al. | 395/500 |
| 5,101,492 | 3/1992 | Schultz et al. | 395/575 |
| 5,134,619 | 7/1992 | Henson et al. | 371/40.1 |
| 5,140,592 | 8/1992 | Idleman et al. | 371/8.1 |
| 5,148,432 | 9/1992 | Gordon et al. | 371/10.1 |
| 5,151,985 | 9/1992 | Sander et al. | 395/500 |
| 5,153,881 | 10/1992 | Bruckert et al. | 371/11.3 |
| 5,195,100 | 3/1993 | Katz et al. | 371/66 |
| 5,206,943 | 4/1993 | Callison et al. | 395/425 |
| 5,210,860 | 5/1993 | Pfeffer et al. | 395/575 |
| 5,255,270 | 10/1993 | Yanai et al. | 371/10.2 |
| 5,255,367 | 10/1993 | Bruckert et al. | 395/200 |
| 5,274,645 | 12/1993 | Idleman et al. | 371/10.1 |
| 5,285,451 | 2/1994 | Henson et al. | 371/11.1 |
| 5,291,494 | 3/1994 | Brukert et al. | 371/11.3 |
| 5,295,258 | 3/1994 | Jewett et al. | 395/575 |
| 5,313,475 | 5/1994 | Cromer et al. | 371/40.1 |
| 5,313,585 | 5/1994 | Jeffries et al. | 395/275 |
| 5,313,624 | 5/1994 | Harriman et al. | 395/575 |
| 5,313,648 | 5/1994 | Ehlig et al. | 395/800 |
| 5,325,517 | 6/1994 | Baker et al. | 395/575 |
| 5,327,570 | 7/1994 | Foster et al. | 395/800 |

*Primary Examiner*—Robert W. Beausoliel, Jr.
*Assistant Examiner*—Norman M. Wright
*Attorney, Agent, or Firm*—Weingarten, Schurgin, Gagnebin & Hayes LLP

[57] ABSTRACT

An XOR controller which is capable of performing the XOR operations necessary to generate a new parity value corresponding to new data being written to a disk storage device from a host computer without the intervention of the storage subsystem microprocessor. In one embodiment the storage subsystem microprocessor controls the loading of the new data from the host and old data and parity from a disk storage device into cache memory, if such data is not already in cache memory, and creates the appropriate data structures. The storage subsystem microprocessor then loads the XOR controller with a pointer to a table in cache memory containing information needed by the XOR controller to perform the XOR operations. The XOR controller, upon completion of the XOR operations on all the data, informs the storage subsystem microprocessor of such completion. Thereafter, the microprocessor causes the new data and new parity to be written to the disk storage device from the cache memory.

15 Claims, 10 Drawing Sheets

XOR CONTROLLER FOR A STORAGE SUBSYSTEM

FIELD OF THE INVENTION

The invention relates generally to data storage subsystems and more specifically to devices for generating parity information in data storage subsystems.

BACKGROUND OF THE INVENTION

A typical implementation of a RAID (Redundant Array of Independent Disks) type storage subsystem includes a plurality of disk storage devices (such as magnetic disk drives) in electrical communication with a RAID disk storage device controller. Upon the receipt of a write or read command from a host computer, the RAID storage device controller writes blocks of data to or reads blocks of data from the disk storage devices. Depending upon the RAID implementation level, the blocks of data and the parity of the blocks of data are distributed among the disk storage devices.

Regardless of which disk storage device stores each block of data and which disk storage device stores the parity of the blocks of data, the value of the parity for the data to be stored on the disk storage device is typically generated by exclusive ORing (XORing) the corresponding data blocks on each of the disk storage devices. Thus, for example, if four disk storage devices, which will be referred to as disk drives, are used to store blocks of data, and if a fifth disk drive is used to store the parity of those blocks of data, the parity stored on the parity disk drive is generated by the expression:

$$P_5 = DATA_1 \oplus DATA_2 \oplus DATA_3 \oplus DATA_4$$

where $P_5$ is the parity stored on the 5th disk drive, $DATA_{1,2,3,4}$ is the block of data stored on the first, 2nd, 3rd and 4th disk drives and $\oplus$ is the exclusive OR (XOR) operation.

The value of parity of the data blocks is stored by the RAID system to reduce the probability that data will be irretrievable if that data stored on a disk drive becomes unreadable. Thus, if one of the disk drives fails so that its data becomes unreadable, each data block that is stored on that disk drive may be recovered from the corresponding data blocks stored on the remaining data disk drives and the parity stored on the parity disk drive.

Although such RAID implementations help assure the integrity of the data stored on the disk storage subsystem, disk subsystems in certain RAID implementations may, as a result of the storing of parity, require four disk operations when a block of data, $D_{new}$, is written to a location on the disk storage device. That is, when the block of data, $D_{new}$, is to be written to a location on a disk storage device, the block of data previously at the location on the disk, $D_{old}$, is first read into memory on the disk storage device controller. Then the old parity data, $P_{old}$, for the previously stored blocks of data including $D_{old}$ is read from the disk storage device containing the parity. Next, $D_{new}$, $D_{old}$ and $P_{old}$ are exclusive OR'd to generate a new parity value, $P_{new}$. Two write operations are then performed to write both $P_{new}$ and $D_{new}$ to the proper disks. While these operations are being performed by the microprocessor of the storage subsystem, the microprocessor is prevented from executing other tasks. The present invention reduces the amount of time the storage subsystem microprocessor uses to perform the required XOR operations on the data being transferred from the host.

SUMMARY OF THE INVENTION

The invention relates to an XOR controller and method for performing the XOR operations necessary to generate a new parity value corresponding to new data being written from a host computer to a disk storage device in a storage subsystem without the intervention of the storage subsystem microprocessor. In one embodiment the storage subsystem microprocessor controls both SCSI I/O processors (SIOPs) and a host interface, which load the new data (from the host), the old data (from the disk storage device, if the old data is not in cache), and the old parity (from the disk storage device, if the old parity is not in cache) into cache memory. The storage subsystem microprocessor then creates, also in cache memory, a descriptor table containing information about the location, amount and other information about this data. The storage subsystem microprocessor then loads a register in the XOR controller with a pointer to the descriptor table and instructs the XOR controller to perform the XOR operations. The XOR controller, using the information in the descriptor table, initializes certain registers in the XOR controller using the information from the descriptor table, reads the data located in cache memory, performs the XOR operation and writes the result into cache memory. Once the XOR operation has been completed on all the data, the XOR controller informs the subsystem microprocessor which then causes the data to be written to the disk storage device from the cache memory.

BRIEF DESCRIPTION OF THE DRAWINGS

The above and further advantages of this invention may be better understood by referring to the following description taken in conjunction with the accompanying drawing, in which.

DESCRIPTION OF THE PREFERRED EMBODIMENT

Figure 1:
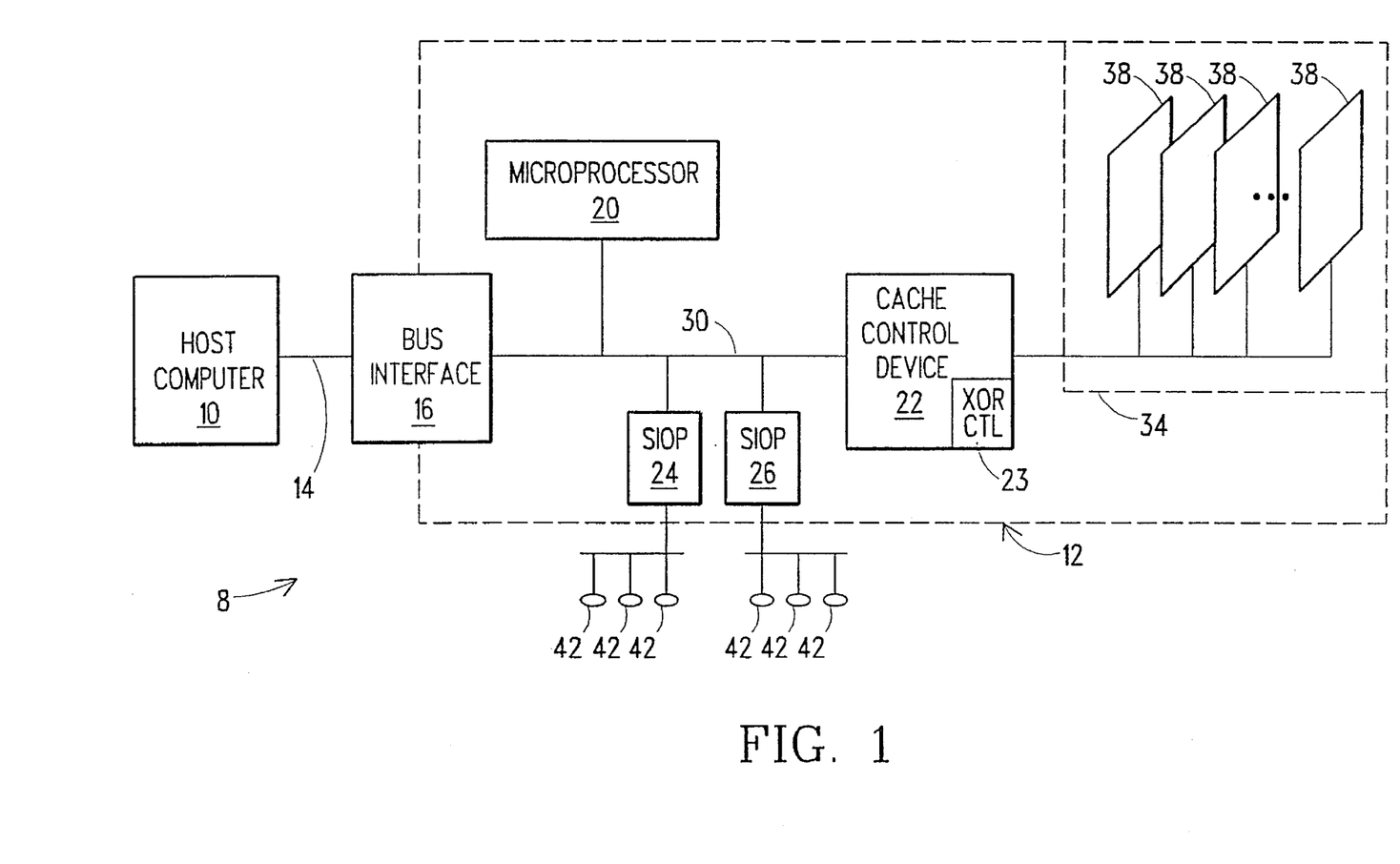
FIG. 1 is a block diagram of a computer system utilizing an embodiment of the invention.

In brief overview, a block diagram of an embodiment of a computer system 8 utilizing the invention is depicted in FIG. 1. A host computer 10 is in electrical communication with a disk controller 12 by way of a bus 14 though a host interface 16. The disk controller 12 includes a microprocessor 20 (in one embodiment a Motorola 68030), a cache control device 22 including an XOR controller 23 (in the form of an application specific integrated circuit or ASIC in one embodiment) and at least one SCSI I/O processor (SIOP) 24, 26 interconnected by an internal bus 30. Each SIOP 24, 26 is in electrical communication with at least one disk storage device 42. The SIOP 24, 26 controls the flow of data between a given disk storage device 42 and a cache memory 34, in response to commands from the microprocessor 20.

The cache control device 22 and XOR controller 23 are also in electrical communication with the cache memory 34. The cache memory 34 consists of at least one single in-line memory module (SIMM) 38. The cache memory 34, in the present embodiment, includes a total of 8 slots for SIMMs. Each slot can presently accommodate a SIMM of 2 Mbytes, 4 Mbytes, 8 Mbytes, 16 Mbytes or 64 Mbytes, although it is appreciated that larger SIMMs can be accommodated as SIMM densities increase.

When a block of new data, $D_{new}$, which is to be written to a given location on a disk storage device 42, is received into the host interface 16, from the host 10 by way of bus 14, the block of new data, $D_{new}$, is first written into cache memory 34. The microprocessor 20 then determines if the block of data previously in the given location on the disk storage device 42, $D_{old}$, and its corresponding old parity value, $P_{old}$, also reside in cache memory 34. If $D_{old}$ and $P_{old}$ do not reside in cache memory 34, the microprocessor 20 instructs the SIOPs 24, 26 to read the block of old data, $D_{old}$, and the block of old parity, $P_{old}$, from disk into cache memory 34. The XOR controller 23 of the cache controller 22 then calculates the new parity value, $P_{new}$, for each block of new data, $D_{new}$, received from host 10 and to be stored on disk storage devices 42. Once all the parity values have been calculated, the microprocessor 20 instructs the SIOPs 24, 26 to write the block of new data, $D_{new}$, and the block of new parity, $P_{new}$, to disk storage devices 42.

Figure 2:
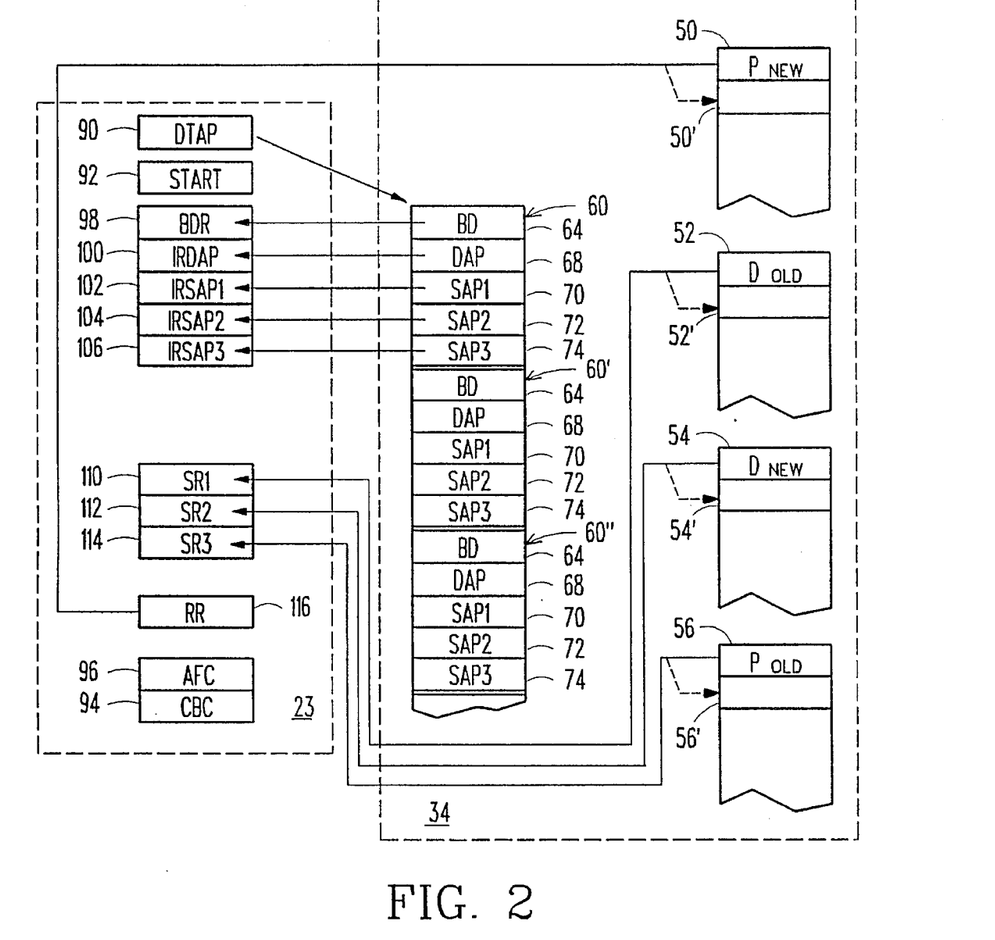
FIGS. 2 and 2a are a block diagram of the data structures utilized in an embodiment of the invention.
Figure 2A:
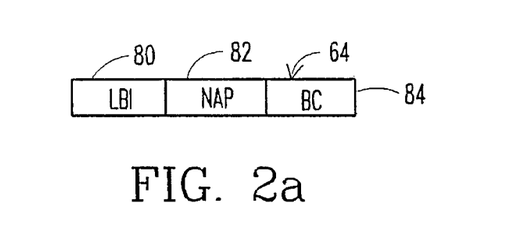

The data structures utilized in the embodiment of the invention shown in FIG. 1 to perform the functions just described are depicted in FIGS. 2 and 2a. Four locations, 50, 52, 54, 56 in cache memory 34 are used to store the first datum of $P_{new}$, $D_{old}$, $D_{new}$ and $P_{old}$. Additional locations in cache memory 34 are allocated for additional data. Other locations are used to store one or more descriptor tables 60. Each descriptor table 60 provides address pointers for the first memory storage locations in cache memory for $P_{new}$, $D_{old}$, $D_{new}$ and $P_{old}$, as well as other information employed by the XOR controller 23.

In one embodiment each descriptor table 60 includes a block descriptor (BD) 64, a destination address pointer (DAP) 68, and three source address pointers (SAP1) 70, (SAP2) 72, (SAP3) 74. The block descriptor (BD) 64 (FIG. 2a) includes a last block indicator (LBI) 80, a number of address pointers (NAP) 82, and a byte count (BC) 84. Because the descriptor table (60) may be part of a linked list of descriptor tables (60', 60"), each providing storage location information for different blocks of data transferred by different write requests from the host 10, the last block indicator (LBI) 80 of the block descriptor 64 of the descriptor table (60") is used to indicate the last descriptor table 60" in a series of descriptor tables (60, 60', 60"). The number of address pointers (NAP) 82 is used to indicate the number of address entries in the descriptor table (60). In the embodiment having one destination address pointer (DAP) 68 and three source address pointers (SAP1-3) 70, 72, 74, the value in the number of address pointers (NAP) 82 would be four. The value in the byte count (BC) 84 indicates the number of bytes of data for which new parity values, $P_{new}$, are to be calculated. It should be noted that although only three source address pointers and one destination address pointer are shown in the drawing for clarity, up to NAP locations maybe used in the table.

The destination address pointer (DAP) contains the address 50 in cache memory 34 to which $P_{new}$ is to be written. Similarly source address pointers 1–3 (SAP1, SAP2, SAP3) contain the addresses of the locations 52, 54, 56, in cache memory 34 in which $D_{old}$, $D_{new}$ and $P_{old}$, respectively, are stored.

The XOR controller 23 includes a register 90 containing the descriptor table address pointer (DTAP) which is address of the first descriptor table 60 of a series of descriptor tables 60, 60', 60". The XOR controller 23 further includes a START register which when written to by the microprocessor 20 invokes the XOR functions of the XOR controller 23, a current byte count (CBC) register 94 which contains the number of bytes for which the new parity, $P_{new}$, has been calculated, an address fetch count (AFC) register 96, which counts the number of address pointers read from cache, and a block descriptor register (BDR) which contains a copy of the block descriptor (BD) 64 in cache memory 34. In addition the XOR controller 23 includes incrementing registers (IRDAP) 100, (IRSAP1) 102, (IRSAP2) 104, and (IRSAP3) 106, which initially contain copies of the addresses held in the DAP 68, SAP1 70, SAP2 72, and SAP3 74 locations in cache memory 34.

Finally, the XOR controller 23 includes three source registers (SR1, SR2, SR3) 110, 112, 114 which contain the values of $D_{old}$, $D_{new}$ and $P_{old}$, respectively, from their respective locations 52, 54, 56 in cache memory 34 and a result register (RR) 116 which holds the result of the XOR operation on the values of $D_{old}$, $D_{new}$ and $D_{old}$.

When the host interface 16, which may also be a SIOP, receives a write request from the host computer 10 to write a block of data, $D_{new}$, to a location on disk storage device 42, the host interface 16 or SIOP first writes the block of new data, $D_{new}$, to the appropriate location 54 in cache memory 34 and then notifies the microprocessor 20 that new data is available in cache memory 34. The microprocessor 20 then determines if the block of old data, $D_{old}$, previously stored in the requested location, exists presently in cache memory 34. If the data previously in that location does not reside in cache memory 34, the microprocessor 20 requests the SIOP 24, 26 read the block of data, $D_{old}$, from disk 42 and store it in cache memory 34, starting in the appropriate location 52. The microprocessor 20 then determines if the block of old parity data, $P_{old}$, which was previously calculated using the previous data, $D_{old}$, also presently resides in cache memory 34 and if it does not, the microprocessor 20 requests the SIOP 24, 26 read the block of old parity data, $P_{old}$, from disk 42 and store it in cache memory 34 starting in the appropriate location 56.

Once all the required data is in cache memory 34, the microprocessor 20 builds a descriptor table 60 with information regarding the data stored in cache memory 34. The microprocessor 20 determines if the descriptor table 60 is one of a sequence of tables and sets the last block indicator (LBI) 80 appropriately. For example, if the blocks of old data, $D_{old}$, in cache are non-contiguous, the microprocessor 20 will build a descriptor table 60 for each group of data blocks and concatenate the descriptor tables 60, 60', 60". The microprocessor 20 then sets the number of address pointers (NAP) 82 to the number of address pointers contained within the table. In this example the number of address pointers is four. The microprocessor 20 then sets the value of the byte count (BC) 84 to the number of bytes which the host computer 10 has requested be written.

Once the block descriptor (BD) 64 is complete, the microprocessor 20 writes the addresses 52, 54, 65 of $D_{old}$, $D_{new}$ and $P_{old}$, respectively, into source address pointer locations (SAP1 70, SAP2 72 and SAP3 74) respectively.

The microprocessor 20 then writes the address 50, into which $P_{new}$ is to be written, into DAP 68. When the descriptor table 60 is thus completed, the microprocessor 20 writes the address of the descriptor table 60 into the descriptor table address pointer (DTAP) 90 of the XOR controller 23 and, by writing a value into the START location 92 of the XOR controller 23, invokes the XOR controller 23 to perform the required XOR operations.

Once the START location 92 has been written to, the XOR controller 23 reads the address of the descriptor table 60 stored in descriptor table address pointer (DTAP) 90. The XOR controller 23 then copies: (1) the value of the block descriptor (BD) 64 into the block descriptor register (BDR) 98, (2) the address in the destination address pointer (DAP) 68 into the incrementing register for the destination address pointer (IRDAP) 100, and (3) the address in each of the source address pointers (SAP1, SAP2, SAP3) 70, 72, 74 into their respective incrementing registers for the source address pointers (IRSAP1, IRSAP2, IRSAP3) 102, 104, 106, respectively.

Using the addresses in the incrementing registers for the source address pointers (IRSAP1 102), (IRSAP2 104), (IRSAP3 106), the XOR controller 23 copies: (1) the data value ($D_{old}$) in the address 52 pointed to by the value in IRSAP1 102 into the first source register (SR1) 110, (2) the data value ($D_{new}$) in the address 54 pointed to by the value in IRSAP2 104 into the second source register (SR2) 112, and (3) the data value ($P_{old}$) in the address 56 pointed to by the value in IRSAP3 106 into the third source register (SR3) 114. The XOR controller then performs the XOR operation and, after placing the result in the result register (RR) 116, writes the result ($P_{new}$) into the location 50, pointed to by the IRDAP 100.

Once the XOR calculation has taken place, the incrementing registers IRDAP 100, IRSAP1 102, IRSAP2 104, and IRSAP3 106, increment, thereby pointing to the next locations 50', 52', 54', 56', in cache memory 34 which hold the subsequent values of $D_{old}$, $D_{new}$ and $P_{old}$ (shown with an arrow in phantom) and which will hold the next value of $P_{new}$. The current byte counter (CBC) 94 is also incremented. The XOR controller 23 then compares the value in the current byte counter (CBC) 94 with the value in the byte counter (BC) 84 portion of the block descriptor (BD) 64.

If the two values are equal, the XOR controller 23 has completed the XOR operation on each byte of data being written to the disks 42. The XOR controller 23 then sets an interrupt to the microprocessor 20, which then instructs the SIOPs 24, 26 to write the data in cache memory 34 to disk 42.

If the two values are not equal, the cache controller 22 repeats the process by loading the data $D_{old}$, $D_{new}$ and $P_{old}$, pointed to by IRSAP1 102, IRSAP2 104, IRSAP3 106 into SR1 110, SR2 112 and SR3 114, respectively, performing the XOR operation and storing the result, $P_{new}$, from the result register (RR) 116 into the location pointed to by IRDAP 100. Again, once the parity data is stored, CBC 94 is again compared to the BC value 84 and the cycle repeated again if the number of bytes transferred is not equal to the number of bytes requested. Thus the XOR controller 23 is capable of recalculating the new parity for each block of data (once the microprocessor 20 has configured the data in the cache memory 34 and created the descriptor table 60) without further intervention by the microprocessor 20, thereby freeing the microprocessor 20 for other tasks.

Figure 3:
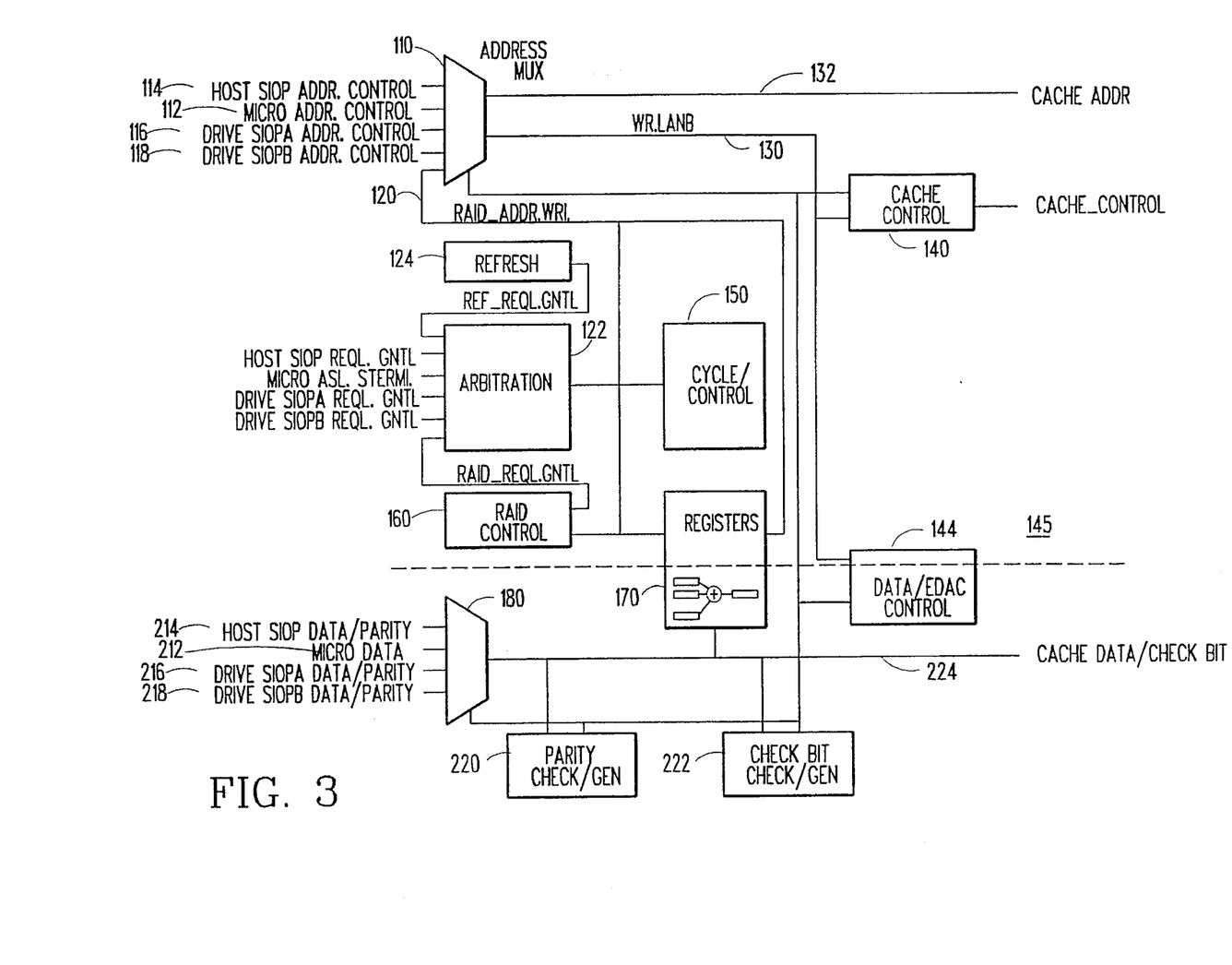
FIG. 3 is a functional block diagram of an embodiment of a portion of a storage subsystem utilizing an embodiment of the invention.
Figure 3A:
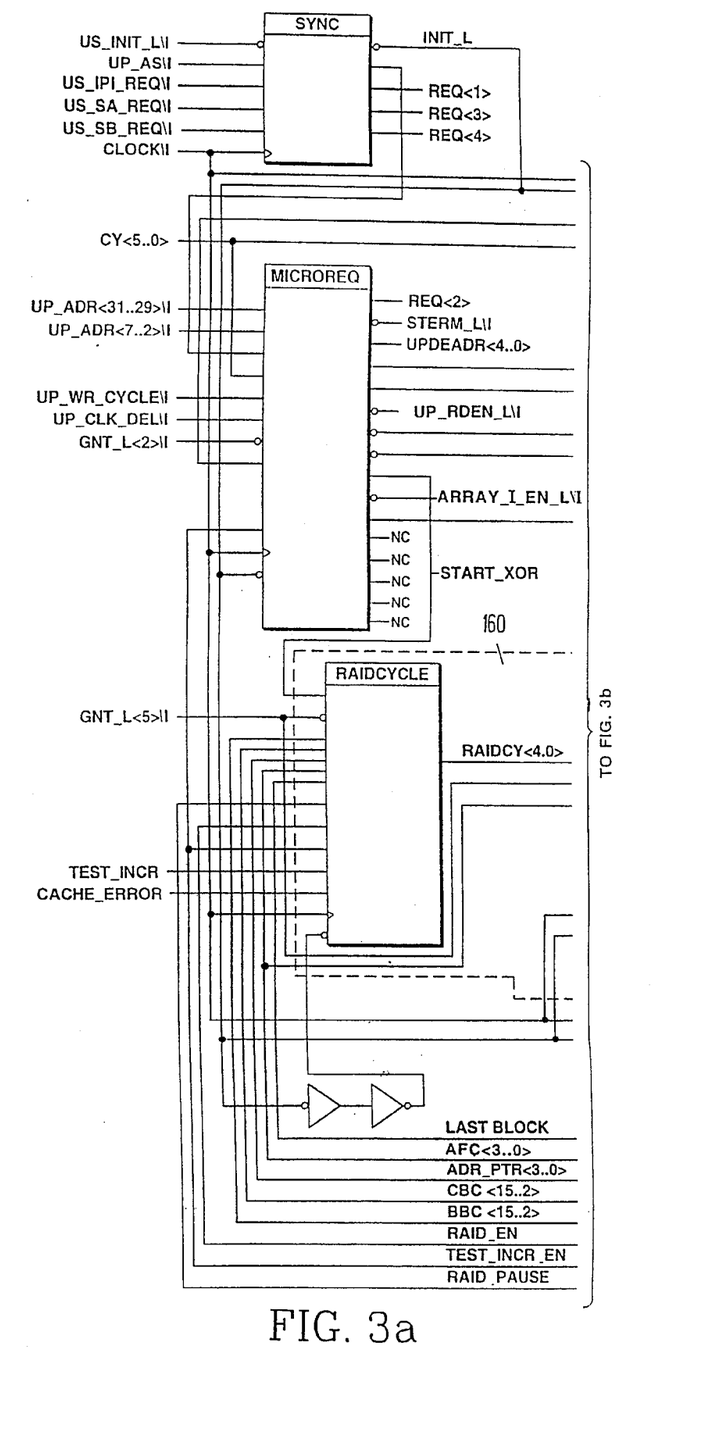
FIGS. 3a–3e are logic diagrams of an embodiment of a portion of a storage subsystem utilizing an embodiment of the invention shown in FIG. 3.
Figure 3B:
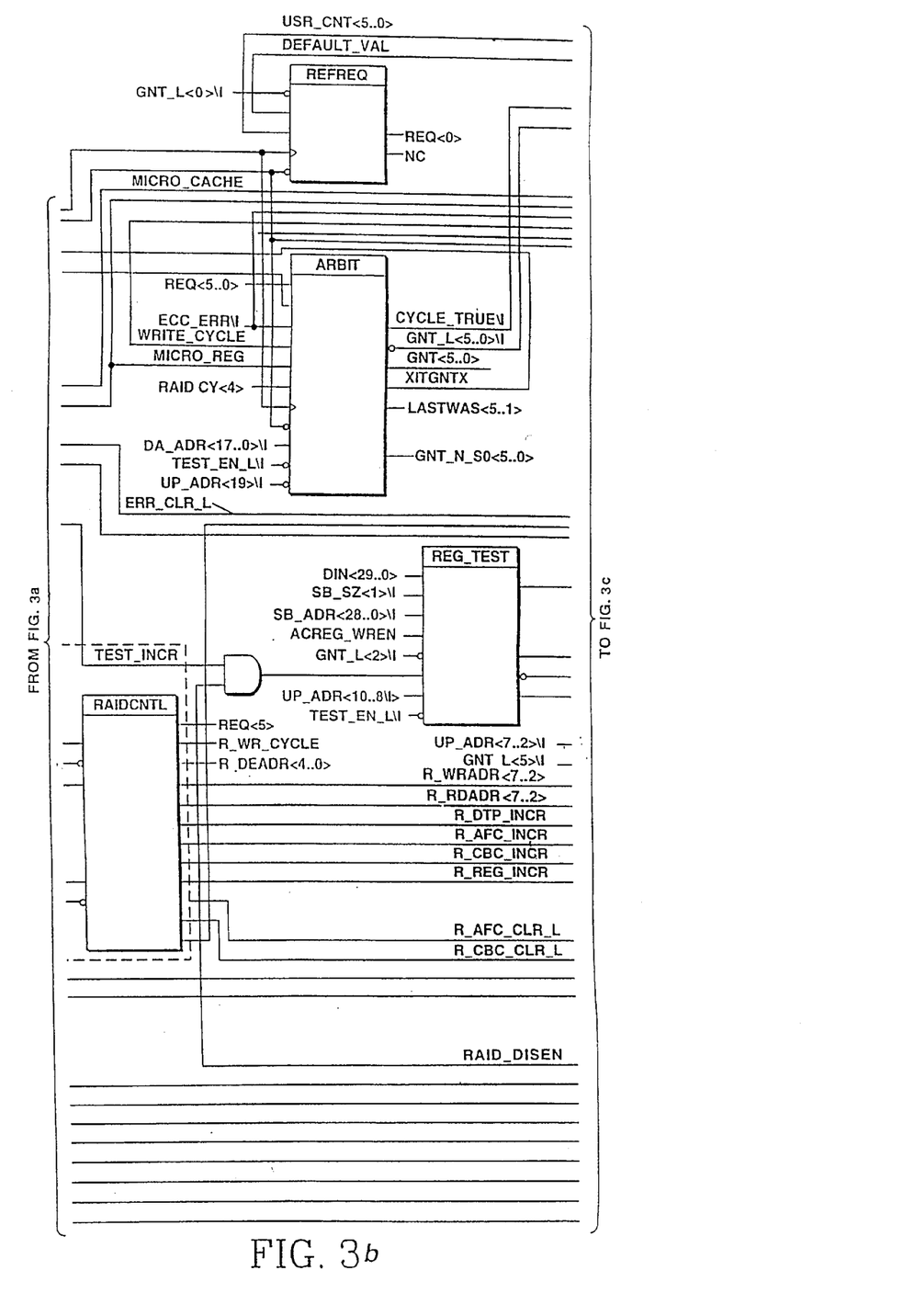
Figure 3C:
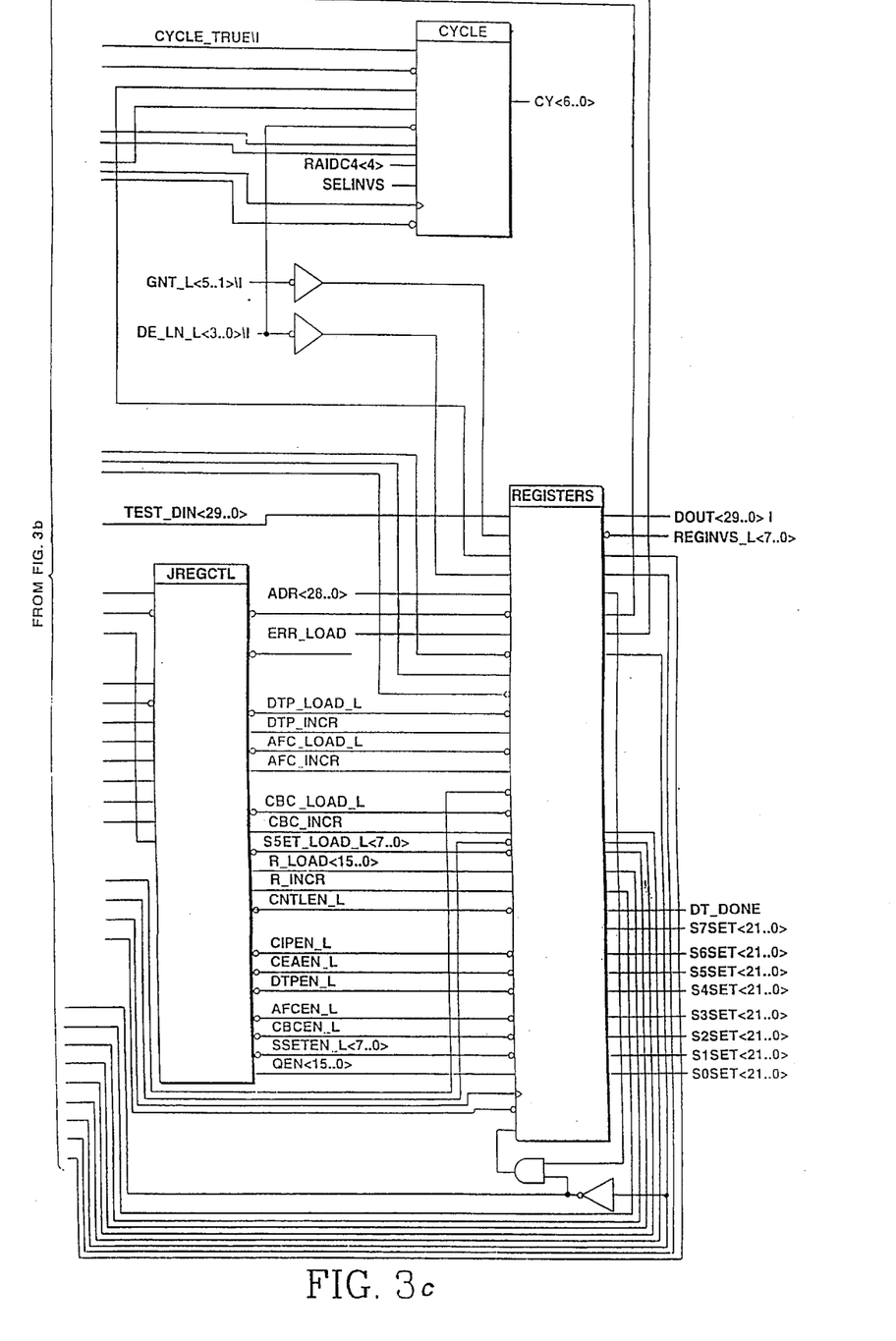
Figure 3D:
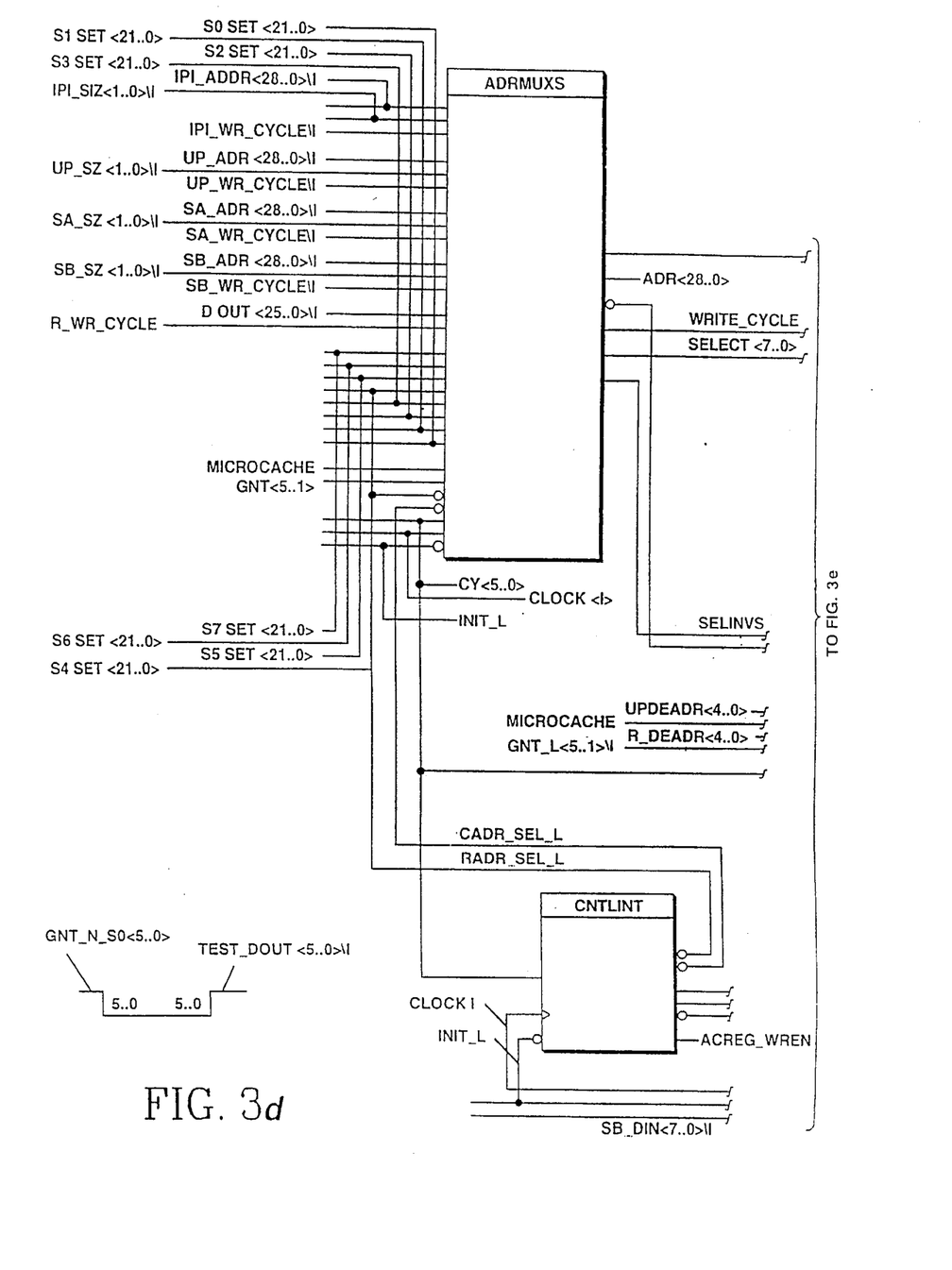
Figure 3E:
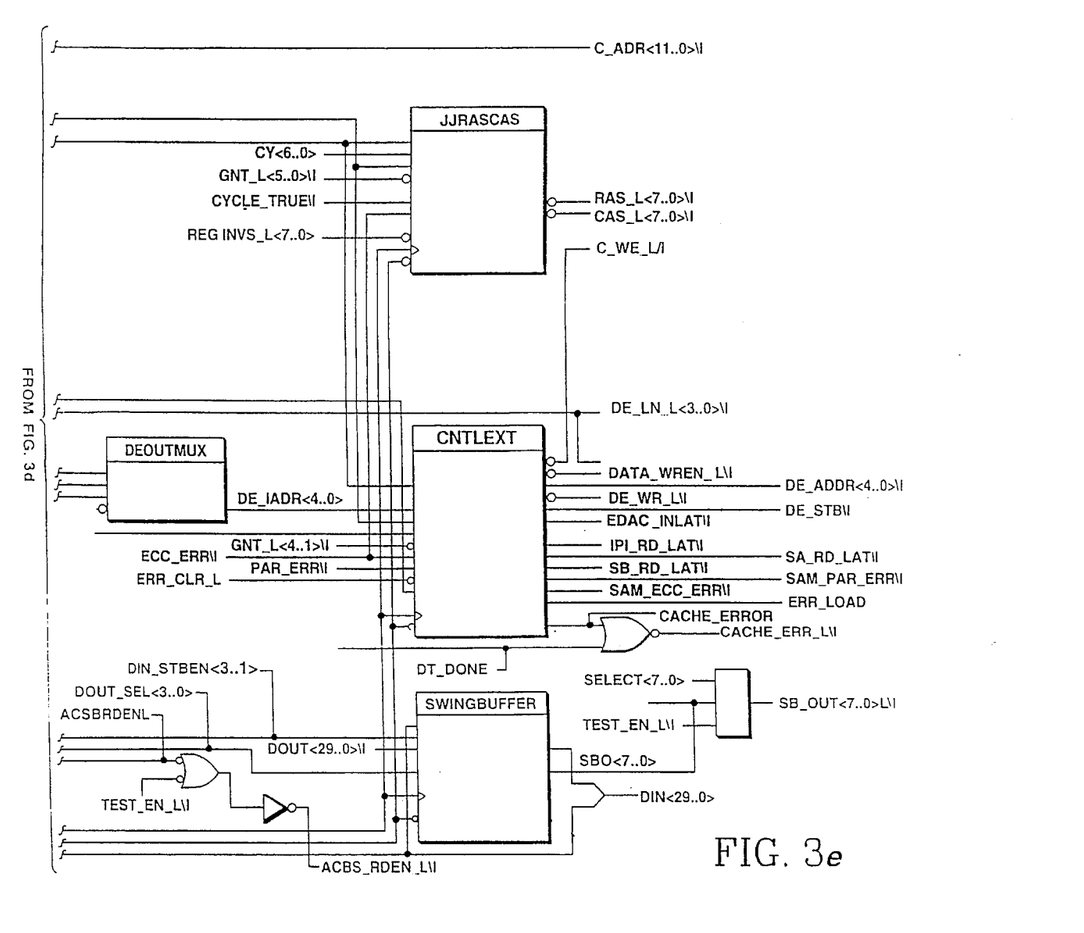

A functional block diagram of an embodiment of a cache controller 22 utilizing the XOR controller 23 of the invention is shown in FIG. 3. In this embodiment an address multiplexer (ADDRESS MUX) 110 performs the addressing and control multiplexing for five ports (from the microprocessor (20) 112, the host (10) 114, the SIOP (26) 116, the SIOP (28) 118, and RAID 120) to the cache memory 34 under the control of cache arbitration logic (ARBITRATION) 122. Based upon the signal from ARBITRATION 122, information from the port granted access to the cache 34 passes through the ADDRESS MUX 110.

A sixth port, from the SIMM refresh circuits (REFRESH) 124, does not pass through the ADDRESS MUX 110 but is still under the control of the ARBITRATION logic 122. Although arbitration is performed among the other five ports in a round robin fashion, the highest priority is given to REFRESH 124. In one embodiment, the REFRESH block 124 generates the refresh requests for the SIMM 38 of the cache memory 34 at a default interval of 15.25 μsec. Upon power up, refresh is enabled for all volatile cache memory or DRAM, but refresh for any non-volatile SIMM must await operation by the microprocessor 20.

The signals passing through the ADDRESS MUX 110 are control 130 and address information 132 which is passed to the cache controller (CACHE CONTROL) 140 and the cache memory 34, respectively. The CACHE CONTROL 140 generates the appropriate row address strobe (RAS), column address strobe (CAS) and write enable (WE) signals for cache memory 34.

A D/EASIC CONTROL 144 implements all of the data bus functions while a CYCLE/CONTROL block 150 is the state machine which generates all the control signals for the other blocks. The state of the state machine is based upon the port granted access to cache memory 34, the type of operation desired to be performed, the type of SIMM at the location in cache memory 34 and the existence of any error condition. A RAID controller (RAID CONTROL) 160 is a state machine that performs RAID hardware assisted functions, such as direct memory access DMA, and the register block (REGISTERS) 170 contains the registers used by the other blocks.

A data multiplexer 180 performs the data multiplexing for four of the five ports (from the microprocessor (20) 212, the host (10) 214, the SIOP (26) 216, and the SIOP (28) 218) to cache memory 34. A parity check/generation circuit 220 and a check bit check/generation circuit 222 associated with the data path 224 provides the error correcting capability for the controller 22. A block diagram of an embodiment of the portion of a cache controller 22 including the XOR controller 23 of the invention, as shown as portion 145 in FIG. 3, and as implemented as an application specific integrated circuit (ASIC) is depicted in FIGS. 3a–3e.

Figure 4:
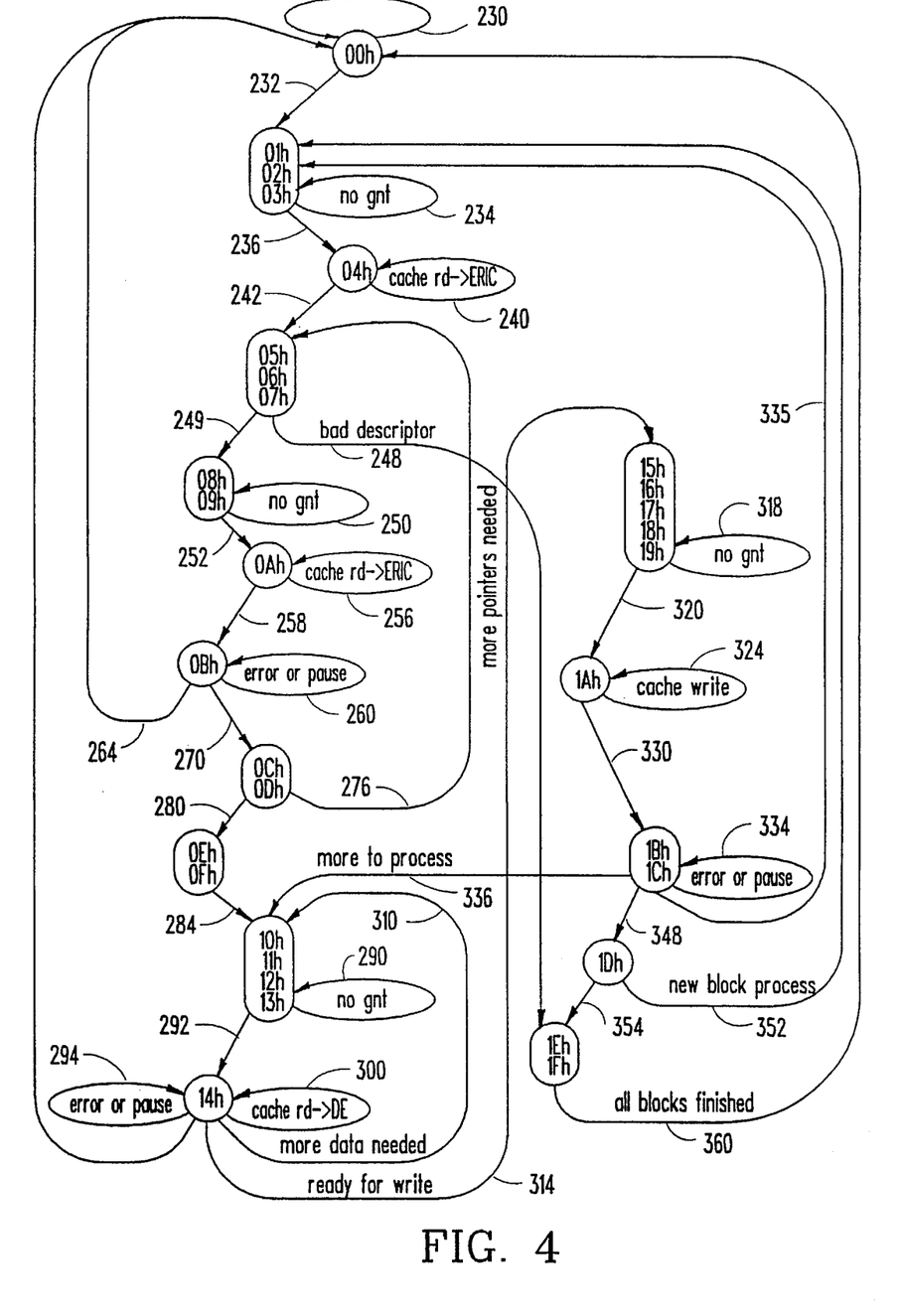
FIG. 4 is a state diagram for the portion of the storage subsystem shown in FIG. 3.

A state diagram for the embodiment of the XOR controller 23 as shown in FIG. 3 is depicted in FIG. 4. Initially, the XOR state machine is in an IDLE state (00H), and loops within that state (Step 230) until the RAID functions are enabled and the START value has been written to the START register 92. When this occurs, the XOR state machine transitions (Step 232) through states (001H and 002H), setting the AFC 94 to 0, and then transitions into another WAIT state (003H) where it remains (Step 234) until access to cache memory 34 is granted (Step 236).

When cache memory 34 access is granted, the XOR state machine enters a READ state (04H) and reads (Step 240), the block descriptor (BD) 64 of the descriptor table 60 in cache memory 34 into the block descriptor register (BDR) 98. The XOR state machine then transitions (Step 242) through states (05H, 06H), incrementing the AFC 98 by 1 and moving into state (07H) which perform bounds checking on the information in the BDR 98. For example, in state (07H), the validity of the value in the byte counter (BC) 64 which is the number of bytes to be transferred is checked. If there is an invalid parameter, the XOR state machine transitions (Step 248) to the terminal states (1EH and 1FH) to report the error status condition to the microprocessor 20.

If the parameters are valid, the XOR state machine transitions (Step 249) through state (08H) to WAIT state (09H), where it remains (Step 250) until a grant is made (Step 252) to access cache memory 34. The XOR state machine then enters a read state (0AH) in which the XOR state machine reads the destination address pointer (DAP) 68 from the descriptor table 60 from cache memory 34 into the IRDAP (Step 256).

Once this is completed, the XOR state machine enters (Step 258) a check state (0BH) where the XOR state machine determines (Step 260) if an error has occurred or if the RAID enable has been deasserted. If the RAID enable has been deasserted, the XOR state machine returns (Step 264) to the IDLE state (00H). If no error has occurred and the RAID enable has not been deasserted, the XOR state machine transitions (Step 270) to states (0CH and 0DH).

If more address pointers are needed, that is, the AFC 98 is less than the NAP 82, the XOR state machine loops (Step 276) to state (05H) to read another address pointer. If all the required address pointers have been read, that is, the AFC 98 equals the NAP 82, the XOR state machine transitions (Step 280) through states (0EH and 0FH), which reset the AFC 98 to 0 and increment the AFC 98 by 1. The XOR state machine then transitions (Step 284) through states (10H, 11H, 12H), during which the AFC 98 is incremented again. The XOR state machine then enters the WAIT state (13H). The XOR state machine waits (Step 290) in state (13H) until access to cache memory 34 is granted (Step 292).

Once access is granted to cache memory 34, the XOR state machine transitions to READ state (14H) where it determines (Step 294) if an error has occurred or if the RAID enable has been deasserted and if neither has occurred, reads (Step 300) the datum pointed to by the address pointer into the incrementing register, and determining if the value in the AFC 98 equals the value in the CBC 94. For example, during the first time through the loop, $D_{old}$ is read into IRSAP1. If more data are needed as indicated by the AFC 98 not equaling the CBC 94 (for example during the first time through the loop, both $D_{new}$ and $P_{old}$ are still required), the XOR state machine returns (Step 310) to state (10H) to read the next datum.

Once all the data has been read into the proper registers and the XOR operation completed, the XOR state machine transitions to prepare to perform a write operation (Step 314). The XOR state machine then transitions through states (15H, 16H, 17H, and 18H) during which the AFC 98 is cleared and incremented to 1 and moves into WAIT state (19H), where it awaits (Step 318) a grant to access cache memory 34.

When a grant occurs, the XOR state machine then enters (Step 320) the WRITE STATE (1AH) and writes (Step 324) the new parity, $P_{new}$, which results from the XOR operation, from the result register (RR) 116 into the location 50 in cache memory 34 as pointed to by IRDAP 100. From this state, the XOR state machine enters (Step 330) a CHECK state (1BH) to again determine (Step 334) if an error has occurred or if the RAID enable has been deasserted. If an error has occurred or if the RAID enable has been deasserted, the XOR state machine transitions (Step 335) back to the IDLE state (00H). If neither has occurred, the XOR state machine enters a COMPARE STATE (1CH), in which the XOR state machine determines if there is more data to process.

If the current byte count (CBC) 94 does not equal the byte count (BC) 64, indicating there are more bytes upon which to perform the XOR operation, the XOR state machine transitions (Step 336) to state (10H) to repeat that portion of the loop. If there is no further data upon which to calculate parity (Step 348) the XOR state machine enters the ADDITIONAL BLOCKS state (1DH) in which it determines if the last block indicator (LBI) 80 is set, meaning that there are additional descriptor tables 60', 60" pointing to additional data. If there are additional descriptor tables 60', 60" the XOR state machine loops (Step 352) to state (01H) and the process repeats. If LBI equals one, indicating that the last descriptor table has been processed, the XOR state machine transitions (Step 354) to COMPLETION states (1EH and 1FH) which generate an interrupt to the microprocessor 20 to indicate that the XOR calculations are complete and then transitions (Step 360) back to the IDLE STATE (00H).

Figure 5:
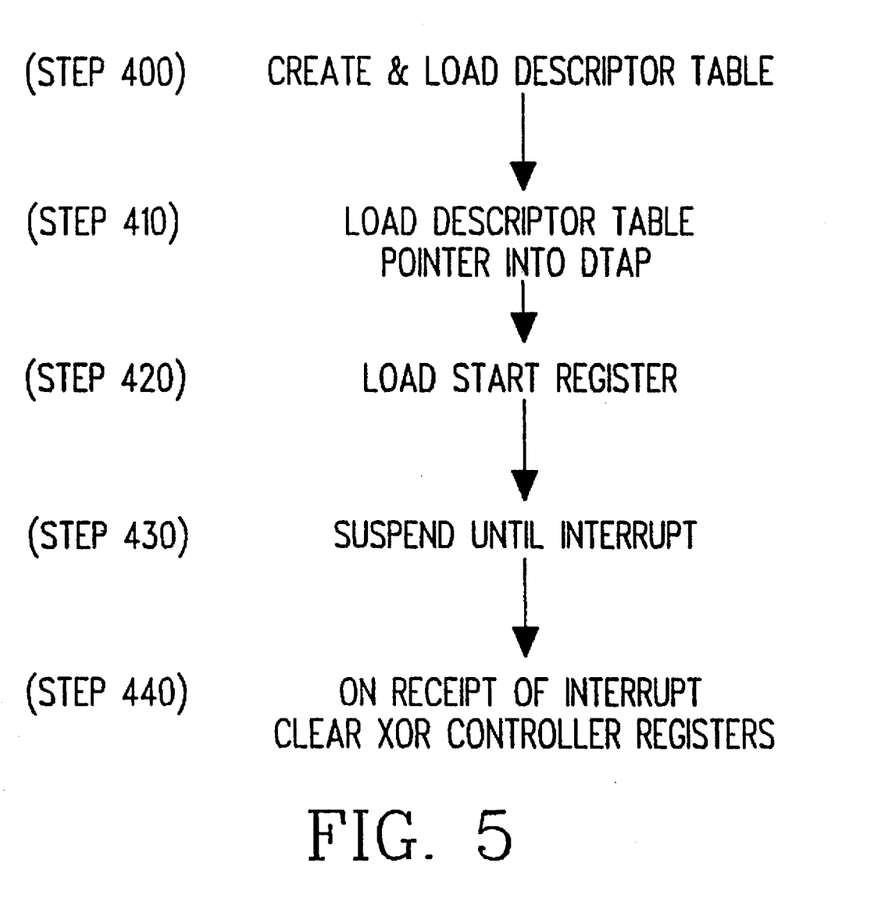
FIG. 5 is a flow diagram of the algorithm used by the microprocessor to invoke the XOR controller of the invention.

In order to set up the data structures in the cache memory needed by the XOR controller, the microprocessor 20 executes the steps shown in FIG. 5. The microprocessor 20 creates and loads (Step 400) a descriptor table 60 with the appropriate addresses and information. Then the microprocessor 20 loads the descriptor table address pointer (DTAP) register 90 in the XOR controller 23 with a pointer to the descriptor table 60 in cache memory 34 (Step 410) and then starts (Step 420) the XOR controller 23 by writing into the START register 92 of the XOR controller 23. At this point the XOR controller suspends (Step 430) the task until an interrupt is generated by XOR controller 23. When the interrupt is generated, the microprocessor 20 clears the registers in the XOR controller 23 (Step 440).

Although the XOR controller has been described as having one destination address pointer (DAP) 68 and three source address pointers (SAP1, 70, SAP2, 72, SAP3, 74), this is not a limitation. By selecting the appropriate values in the descriptor table 60, such as (NAP) 82, any number of source and destination registers may be accommodated. For example, in one embodiment, there is one destination address pointer and up to 13 source address pointers.

Thus the XOR controller 23 may be used to calculate parity for a block of data in disk which did not previously exist, by using one SAP for each data block stored on disk 42. Further, the XOR controller 23 may be used to reconstruct data which is unreadable due to a disk drive failure, by XORing the parity corresponding to the unreadable block, with the remaining data blocks used to generate the parity.

Having shown the preferred embodiment, those skilled in the art will realize variations from the disclosed embodiments are possible. Therefore, it is the intention to limit the invention only as indicated by the appended claims.

We claim:

1. A method for XORing, in a disk controller, new data received from a host computer with old data and old parity information, wherein said disk controller interfaces to a plurality of disk drives and is operating under the control of a microprocessor within said disk controller, comprising the steps of:

receiving in said disk controller from said host computer at least one block of new data to be written to said disk drives commencing at a first disk address;

in a first storing step, storing in a cache memory having a plurality of memory locations said at least one block of new data commencing at a first one of said plurality of cache memory locations;

in a second storing step, storing in said cache commencing at second and third ones of said plurality of cache memory locations respectively, at least one block of old data corresponding to the block of data stored at said first disk address and at least one block of old parity information corresponding to the parity for said at least one block of old data;

providing at least one first control signal from said microprocessor within said disk controller to an XOR calculation controller;

generating with said XOR calculation controller, at least one block of new parity information by XORing said at least one block of new data, said at least one block of old data and said at least one block of old parity information in response to receipt by said XOR calculation controller of said at least one first control signal provided by said microprocessor;

in a third storing step, storing said at least one block of new parity information in said cache commencing at a fourth one of said plurality of memory locations; and providing at least one second control signal from said XOR calculation controller to said microprocessor following the completion of said third storing step.

2. A method of performing an exclusive-or operation on data in a disk storage controller having a microprocessor, a memory, and an exclusive-or processor having a plurality of registers, said method comprising the steps of:

placing a first datum to be operated on by said exclusive-or operation in a first location in said memory;

placing a second datum to be operated on by said exclusive-or operation in a second location in said memory;

selecting with said microprocessor a third location in memory to hold the result of said exclusive-or operation;

writing, with said microprocessor, into a first location in a table in memory, an address corresponding to said first location in memory;

writing, with said microprocessor, into a second location in said table in memory, an address corresponding to said second location in memory;

writing, with said microprocessor, into a third location in said table in memory, an address corresponding to said third location in memory;

writing, with said microprocessor, into a fourth location in said table in memory, a block descriptor containing the number of addresses stored in said table in memory;

writing, with said microprocessor, into a first register of said plurality of registers, an address in memory corresponding to a starting address of said table in memory; and writing, with said microprocessor, into a second register of said plurality of registers, a start code to initiate said exclusive-or operation.

3. The method of claim 2 further comprising the steps of:

writing, with said exclusive-or processor, into a third register of said plurality of registers, said address in said first location in said table in memory;

writing, with said exclusive-or processor, into a fourth register of said plurality of registers, said address in said second location in said table in memory;

writing, with said exclusive-or processor, into a fifth register of said plurality of registers, said address in said third location in said table in memory; and writing, with said exclusive-or processor, into a sixth register of said plurality of registers, said address in said fourth location in said table in memory, in response to said microprocessor writing said start code to said second register of said plurality of registers.

4. The method of claim 3 further comprising the steps of:

writing, with said exclusive-or processor, into a seventh register of said plurality of registers, a value in said first location in memory corresponding to said address in said third register of said plurality of registers;

writing, with said exclusive-or processor, into an eighth register of said plurality of registers, a value in said second location in memory corresponding to said address in said fourth register of said plurality of registers;

performing, with said exclusive-or processor, said exclusive-or operation on said value in said seventh register and eighth register of said plurality of registers;

writing, with said exclusive-or processor, a result of said exclusive-or operation into a ninth register of said plurality of registers; and writing, with said exclusive-or processor, into said third location in memory corresponding to the address contained in said fifth register of said plurality of registers said result in said ninth register of said plurality of registers, following the writing, with said exclusive-or processor, into said sixth register of said plurality of registers, said address in said fourth location in said table in memory.

5. The method of claim 2 wherein said block descriptor comprises a plurality of fields, said plurality of fields comprises a first field containing a last block indicator, a second field containing a value indicating a number of address pointers, and a third field containing a value indicating the number of bytes of data upon which said exclusive-or operation is to be performed.

6. The method of claim 5 wherein said microprocessor sets said last block indicator according to whether said table in memory is the last of a sequence of concatenated tables.

7. The method of claim 5 wherein said microprocessor sets said value indicating said number of address pointers according to the number of locations in said table in memory containing addresses corresponding to said locations in memory corresponding to said data to be operated upon by said exclusive-or operation plus this location to hold said result.

8. The method of claim 2 wherein said first datum to be operated on by said exclusive-or processor is placed into said first location in said memory by a host computer in electrical communication with said disk storage controller.

9. The method of claim 2 wherein said memory is cache memory and said second datum to be operated on by said exclusive-or processor is placed into said second location in said memory from a disk storage device in electrical communication with said disk storage controller.

10. A method of generating parity data for data transferred from a host computer to a disk storage device using a disk storage controller having a microprocessor, a memory, and an exclusive-or processor having a plurality of registers, said method comprising the steps of:

placing a first datum of said data transferred from said host computer in a first location in said memory;

placing a second datum in a second location in said memory;

placing a third datum in a third location in said memory;

selecting, with said microprocessor, a fourth location in memory to hold the result of said exclusive-or operation;

writing, with said microprocessor, into a first location in a table in memory, an address corresponding to said first location in memory;

writing, with said microprocessor, into a second location in said table in memory, an address corresponding to said second location in memory;

writing, with said microprocessor, into a third location in said table in memory, an address corresponding to said third location in memory;

writing, with said microprocessor, into a fourth location in said table in memory, an address corresponding to said fourth location in memory;

writing, with said microprocessor, into a fifth location in said table in memory, a block descriptor;

writing, with said microprocessor, into a first register of said plurality of registers, an address in memory corresponding to a starting address of said table in memory; and writing, with said microprocessor, into a second register of said plurality of registers, a start code to initiate said generation of said parity data.

11. The method of claim 10 further comprising the steps of:

writing, with said exclusive-or processor, into a third register of said plurality of registers, said address in said first location in said table in memory;

writing, with said exclusive-or processor, into a fourth register of said plurality of registers, said address in said second location in said table in memory;

writing, with said exclusive-or processor, into a fifth register of said plurality of registers, said address in said third location in said table in memory; and writing, with said exclusive-or processor, into a sixth register of said plurality of registers, said address in said fourth location in said table in memory, in response to said microprocessor writing said start code into said second register of said plurality of registers.

12. The method of claim 11 further comprising the steps of:

writing, with said exclusive-or processor, into a seventh register of said plurality of registers, said value in said first location in memory corresponding to said address in said third register of said plurality of registers;

writing, with said exclusive-or processor, into a eighth register of said plurality of registers, said value in said second location in memory corresponding to said address in said fourth register of said plurality of registers;

writing, with said exclusive-or processor, into a ninth register of said plurality of registers, said value in said third location in memory corresponding to said address in said fifth register of said plurality of registers;

performing an exclusive-or operation with said exclusive-or processor on said values in said seventh, eighth, and ninth registers of said plurality of registers to thereby generate a new parity value corresponding to said datum from said host;

writing, with said exclusive-or processor, said new parity value into a tenth register of said plurality of registers; and writing, with said exclusive-or processor, into said fourth location in memory corresponding to said address contained in said sixth register of said plurality of registers the new parity value in said tenth register of said plurality of registers, following the writing, with said exclusive-or processor, into a sixth register of said plurality of registers, said address in said fourth location in said table in memory.

13. A method for generating a datum corresponding to a datum from a first disk storage device of a plurality of disk storage devices wherein one disk storage device of said plurality of disk storage devices stores parity data generated in response to data stored on the other disk storage devices of said array of disk storage devices, said method comprising the steps of:

placing a datum, corresponding to said datum to be generated from said first disk storage device, from each of said remaining disk storage devices of said array of disk storage devices into locations in a memory;

selecting, with a microprocessor, a result location in said memory to hold a result of an exclusive-or operation;

writing, with said microprocessor, into locations in a table in said memory, addresses corresponding to said locations in said memory storing said datum from each of said remaining disk storage devices of said array of disk storage devices;

writing, with said microprocessor, into a result location in said table in memory, an address corresponding to said result location in said memory to hold a result of said exclusive-or operation;

writing, with said microprocessor, into a block location in said table in memory, a block descriptor, said block descriptor including a field with the number of locations in said table containing said addresses corresponding to said locations in said memory storing said datum, corresponding to said datum to be generated from said first disk storage device, from each of said remaining disk storage devices of said array of disk storage devices and said address corresponding to said result location in said memory;

writing, with said microprocessor, into a first register of a plurality of registers, an address in memory corresponding to a starting address of said table in memory; and writing, with said microprocessor, into a second register of said plurality of registers, a start code to initiate the generation of said datum.

14. The method of claim 13 further comprising the steps of:

writing, with said exclusive-or processor, into each source register of said plurality of registers, a corresponding one of said addresses in said table in memory corresponding to said locations in said memory storing said datum, corresponding to said datum to be generated from said first disk storage device, from each of said remaining disk storage devices of said array of disk storage devices; and writing, with said exclusive-or processor, into a destination register of said plurality of registers, said address in said result location in said table in memory, in response to said microprocessor writing said start code into a said second register of said plurality of registers.

15. The method of claim 13 further comprising the steps of:

writing, with said exclusive-or processor, into each data register of said plurality of registers, a value from said locations in memory corresponding to said addresses in each source register of said plurality of registers;

performing an exclusive-or operation with said exclusive-or processor on said values in each data register of said plurality of registers, to thereby generate said datum corresponding to said datum from said first disk storage device;

writing, with said exclusive-or processor, said datum corresponding to said datum from said first disk storage device into a result register of said plurality of registers; and writing, with said exclusive-or processor, into said result location in memory corresponding to said address contained in said destination register of said plurality of registers said datum corresponding to said datum from said first disk storage device from said result register of said plurality of registers.

\* \* \* \* \*